United States Patent [19]

Amimoto et al.

[11] Patent Number: 5,143,991
[45] Date of Patent: Sep. 1, 1992

[54] COPOLYMER DESOILING AGENT

[75] Inventors: Yoshio Amimoto, Takatsuki; Yuko Hirata, Neyagawa; Masaru Hirai, Suita; Akihiko Ueda, Nishinari, all of Japan

[73] Assignee: Daikin Industries Ltd., Osaka, Japan

[21] Appl. No.: 540,210

[22] Filed: Jun. 19, 1990

[30] Foreign Application Priority Data

Jun. 21, 1989 [JP] Japan ................................. 1-160514
Jul. 27, 1989 [JP] Japan ................................. 1-197103

[51] Int. Cl.$^5$ ............................................. C08F 18/20
[52] U.S. Cl. .................................................... 526/245
[58] Field of Search ......................................... 526/245

[56] References Cited

U.S. PATENT DOCUMENTS

| | | | |
|---|---|---|---|
| 4,547,558 | 10/1985 | Iwatsuki | 526/245 |
| 4,666,977 | 5/1987 | Kihara et al. | 526/245 |
| 4,728,707 | 3/1988 | Amimoto et al. | 526/245 |
| 4,795,793 | 1/1989 | Amimoto et al. | 526/245 |

FOREIGN PATENT DOCUMENTS

| | | | |
|---|---|---|---|
| 0195714 | 9/1986 | European Pat. Off. | |
| 0198252 | 10/1986 | European Pat. Off. | 526/245 |
| 0015411 | 1/1984 | Japan | 526/245 |
| 61-264081 | 11/1986 | Japan | 526/245 |
| 63-210115 | 8/1988 | Japan | 526/245 |
| 560737 | 4/1975 | Switzerland | |
| 1175420 | 12/1969 | United Kingdom | 526/245 |

OTHER PUBLICATIONS

Advances in Chemistry Series 125 ACS Washington D.C. (1973) "Fractionation of Linear Polyethylene with Gel Permeation Chromatography" by Nakajima pp. 98–107.

Primary Examiner—Joseph L. Schofer
Assistant Examiner—N. Sarofim
Attorney, Agent, or Firm—Birch, Stewart, Kolasch & Birch

[57] ABSTRACT

A copolymer comprising (a) an acrylate or methacrylate having a fluoroalkyl group, (b) a polyalkylene glycol acrylate or methacrylate, (c) an acrylate or methacrylate having a hydroxyl group, and (d) at least one compound selected from the group consisting of alkyl acrylates, alkyl methacrylates and butadiene, which can impart durable water- and oil- repellency and soil-releasability to fabrics.

15 Claims, No Drawings

COPOLYMER DESOILING AGENT

BACKGROUND OF THE INVENTION

1. Field of the Invention

The present invention relates to a novel copolymer and more particularly a novel copolymer comprising an acrylate or methacrylate ester having a fluoroalkyl group, a polyalkylene glycol acrylate or methacrylate, an acrylate or methacrylate ester having a hydroxyl group and a compound selected from alkyl acrylates, alkyl methacrylate and butadiene, which copolymer can be used as a desoiling agent.

2. Description of the Related Art

Hitherto, it is known that a copolymer of an acrylate or methacrylate ester having a fluoroalkyl group (hereinafter, sometimes referred to as "fluorine-containing compound") with polyalkylene glycol acrylate or methacrylate and optionally an alkyl acrylate or methacrylate is used as a desoiling agent which imparts water- and oil-repellency to fabrics and makes it easy to remove adhered soils from the fabrics during washing or dry cleaning (cf. Japanese Patent Kokai Publication No. 134786/1978). In a copolymer useful as a desoiling agent, a polyethylene glycol-containing compound appears to assist a detergent in removing soils easily.

A homo- or co-polymer of the fluorine-containing compound is known as a water- and oil-repellent which imparts water- and oil-repellency to articles such as fibers and prevents penetration of oily stains in the articles. However, some fluorine-containing polymers which have much stronger water-repellency which cause the detergent to become ineffective during washing, and make it difficult to release the adhered soils from the fabrics, that is, the polymers decrease the desoiling nature of the articles. Further, such polymers deteriorate the inherent water-absorbance of the fabrics, which the feeling of the fabrics to become worse. To facilitate the release of soils from the fabrics and to keep the good feeling of the fabrics, other desoiling agent which can impart large water-absorbance to the fabrics is often additionally employed. However, such desoiling agent renders soils to adhere easily to the fabrics and tends to liberate from the fabrics.

To improve the resistance of water- and oil-repellency to washing, it is proposed to copolymerize the fluorine-containing compound with an acrylate or methacrylate ester having a hydroxyl group and optionally an alkyl acrylate or methacrylate (cf. Japanese Patent Publication No. 3798/1975 and U.S. Pat. No. 3,356,628).

However, the copolymer comprising the acrylate or methacrylate ester having the hydroxyl group or a hydrophilic group such as polyethylene glycol group and the acrylate or methacrylate ester having the fluoroalkyl group has little durability of soil-releasability and water-repellency against washing, although it has good initial soil-releasability and water- and oil-repellency.

SUMMARY OF THE INVENTION

An object of the present invention is to provide a novel copolymer which can provide a desoiling agent having good initial soil-releasability and also improved durability of desoiling ability.

This and other objects are accomplished by a copolymer comprising:

(a) an acrylate or methacrylate ester having a fluoroalkyl group,
(b) a polyalkylene glycol acrylate or methacrylate,
(c) an acrylate or methacrylate ester having a hydroxyl group, and
(d) at least one compound selected from the group consisting of alkyl acrylates, alkyl methacrylates and butadiene.

The copolymer of the present invention has an average molecular weight of 1000 to 500000.

DETAILED DESCRIPTION OF THE INVENTION

In general, the acrylate or methacrylate ester having the fluoroalkyl group (a) is represented by the formula:

$$R_fROCOCR^1=CH_2 \qquad (I)$$

wherein $R_f$ is a straight or branched $C_3$-$C_{20}$ perfluoroalkyl group, $R^1$ is a hydrogen atom or a methyl group, and R is a straight or branched $C_1$-$C_{10}$ alkylene group, a $-SO_2N(R^2)R^3-$ group in which $R^2$ is a $C_1$-$C_{10}$ alkyl group and $R^3$ is a straight or branched $C_1$-$C_{10}$ alkylene group, or a $-CH_2-CH(OR^4)CH_2-$ group in which $R^4$ is a hydrogen atom or a $C_1$-$C_{10}$ acyl group. Specific examples of the acrylate or methacrylate having the fluoroalkyl group are $CF_3(CF_2)_7(CH_2)_{10}OCOCH=CH_2$,
$CF_3(CF_2)_6CH_2OCOC(CH_3)=CH_2$,
$(CF_3)_2CF(CF_2)_8(CH_2)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_8CH_2CH(OCOCH_3)CH_2OCOC(CH_3)=CH_2$, and
$(CF_3)_2CF(CF_2)_8CH_2CH(OH)CH_2OCOCH=CH_2$.

In general, the polyalkylene glycol acrylate or methacrylate (b) is represented by the formula:

$$CH_2=CR^5COO-(R^6O)_n-R^7 \qquad (II)$$

wherein $R^5$ and $R^7$ are independently a hydrogen atom or a methyl group, $R^6$ is a $C_2$-$C_6$ alkylene group, and n is an integer of 3 to 50.

$R^6$ is preferably $-CH_2CH_2-$, although it may be $-CH(CH_3)CH_2-$ or $-CH(C_2H_5)CH_2-$. In other words, in the present invention, the acrylate or methacrylate (II) in which $R^6$ is $-CH_2CH_2-$, namely, polyethylene glycol acrylate or methacrylate is preferably used. Usually, n is an integer of 3 to 50, preferably 9 to 25. The polyalkylene glycol acrylate or methacrylate may be a mixture of two or more compounds of the formula (II) in which $R^6$ and/or n is different.

Specific examples of the polyalkylene glycol acrylate or methacrylate (b) are
$CH_2=C(CH_3)COO(CH_2CH_2O)_{3-9}H$,
$CH_2=C(CH_3)COO(CH_2CH_2O)_9H$,
$CH_2=C(CH_3)COO(CH_2CH_2O)_6H$,
$CH_2=CHCOO[CH_2CH[CH_3]O]_{11}H$,
$CH_2=CHCOO(CH_2CH_2O)_9H$,
$CH_2=C(CH_3)COO(CH_2CH_2O)_5-[CH_2CH(CH_3)O]_3H$,
$CH_2=C(CH_3)COO(CH_2CH_2O)_9CH_3$, and
$CH_2=C(CH_3)COO(CH_2CH_2O)_{23}H$.

The alkyl acrylate or methacrylate having the hydroxyl group (c) is an alkyl acrylate or methacrylate in which at least one hydrogen atom of the alkyl group is substituted with a hydroxyl group. Optionally, at least one of the remaining hydrogen atoms of the alkyl group may be substituted by a halogen atom. Preferably, the alkyl group has 1 to 5 carbon atoms.

Specific examples of the alkyl acrylate or methacrylate ester having the hydroxyl group (c) are 2-hydroxybutyl (meth)acrylate, glycerol mono(meth)acrylate, 2-hydroxyethyl (meth)acrylate, 2-hydroxypropyl (meth)acrylate, 3-chloro-2-hydroxypropyl (meth)acrylate and the like.

Among the monomer (d), the acrylate or methacrylate is a compound of the formula:

$$CH_2=CR^8COOR^9 \quad (III)$$

wherein $R^8$ is a hydrogen atom or a methyl group, and $R^9$ is a $C_1$-$C_{20}$ straight, branched or cyclic alkyl group. Specific examples of the acrylate or methacrylate are
$CH_2=C(CH_3)COOCH_2CH_2CH_3$,
$CH_2=C(CH_3)COO(CH_2)_5CH_3$,
$CH_2=CHCOOCH_2CH(C_2H_5)CH_2CH_2CH_2CH_3$,
$CH_2=CHCOO(CH_2)_{15}CH_3$,
$CH_2=CHCOOCH_2CH_2CH(CH_3)_2$,
$CH_2=CHCOOCH(CH_3)_2$,
$CH_2=CHCOOCH_2C(CH_3)_2CH_2CH(CH_3)_2$,
$CH_2=C(CH_3)COOCH_2(CH_2)_7C(CH_3)_3$, cyclohexyl (meth)acrylate, and
$CH_2=C(CH_3)COO(CH_2)_2CH(CH_3)CH_2CH(CH_3)_2$.

The ratio of the acrylate or methacrylate ester having the fluoroalkyl group (a) in the copolymer is at least 20% by weight, preferably 30 to 60% by weight. When this ratio is less than 20% by weight, the copolymer has insufficient water- and oil-repellency.

The ratio of the polyalkylene glycol acrylate or methacrylate (b) in the copolymer is at least 10% by weight, preferably 15 to 50% by weight. When this ratio is less than 10% by weight, the copolymer has poor dispersibility in water so that it has insufficient durability.

The ratio of the acrylate or methacrylate ester having the hydroxyl group (c) in the copolymer is at least 10% by weight, preferably 15 to 50% weight. When this ratio is less than 10% by weight, the copolymer has insufficient soil-releasability and durability.

The ratio of the alkyl acrylate, the methacrylate or butadiene (d) is at least 5% by weight, preferably 10 to 40% by weight. When this ratio is less than 5% by weight, the copolymer has poor durability.

The copolymer of the present invention has a number average molecular weight of 1000 to 500,000, preferably 5000 to 200,000. When the molecular weight is less than 1000, the copolymer has insufficient durability. When it is larger than 500,000, the liquid containing the polymer is too viscous so that the processability is decreased.

In addition to the above essential components (a), (b), (c) and (d), the copolymer of the present invention may comprise at least one other comonomer having no fluoroalkyl group, for example, ethylene, vinyl chloride, vinylidene halogenide, styrene, acrylic acid and its alkyl esters, methacrylic acid and its alkyl esters, benzyl methacrylate, vinyl alkyl ketones, vinyl alkyl ethers, isoprene, chloroprene, maleic anhydride and the like. By the use of such other comonomer, water- and oil-repellence, and durability of the soil-releasability or softness of the treated fabrics are improved, and the copolymer can be made cheaper. Further, solubility, water resistance and other properties may be improved.

The copolymer of the present invention may be prepared by a conventional polymerization method such as bulk polymerization, solution polymerization, emulsion polymerization, radiation polymerization and the like. For example, a mixture of the compounds to be polymerized is emulsified in water in the presence of a surfactant and copolymerized.

As a polymerization initiator, a known compound such as a peroxide, an azo compound or a persulfate may be used.

The surfactant is not necessarily used since the polyalkylene glycol acrylate or methacrylate acts as a surfactant. In some cases, anionic, cationic or nonionic emulsifier can be used.

The compounds (a), (b), (c) and (d) may be solution polymerized in an organic solvent in the presence of a polymerization initiating source such as a peroxide or azo compound which is soluble in the employed organic solvent or ionizing radiation.

The copolymer of the present invention may be processed in any formulation such as an emulsion, a solution in a solvent, an aerosol, etc.

The copolymer of the present invention may be applied to a material to be treated in any manner according to the type of formulation. For example, the aqueous emulsion or the solution of the copolymer is applied to the material to be treated by any known coating method such as dipping and then dried. Optionally, the formulation of the copolymer is applied together with a crosslinking agent and cured after application. The aerosol is simply sprayed on the material to be treated, and the sprayed formulation quickly dries and imparts sufficient water- and oil-repellency and soil-releasability to the material.

With the copolymer of the present invention, other polymer may be blended to prepare a desoiling agent. In addition, conventional additive such as other water repellent and/or oil repellent, an insecticide, a flame retardant, an anti-static agent, a dye, a stabilizer or a crease resistant finisher may be used.

The copolymer of the present invention has better durability of soil-releasability than the conventional stain-proofing agents. When butadiene is used as the component (d), the copolymer has further improved initial oil-repellency and durability of oil-repellence.

PREFERRED EMBODIMENTS OF THE INVENTION

The present invention will be illustrated in detail by the following Examples, in which "%" is by weight unless otherwise indicated.

In the Examples, the water-repellency and the oil-repellency are expressed according to the following criteria:

The water-repellency is expressed by Water Repellency No. which is measured by the spraying method according to JIS L-1005 (see Table 1), and the oil-repellency is evaluated by judging a degree of penetration of a sample liquid shown in Table 1 after 30 seconds from dropping several drops of the sample liquid (a diameter of about 4 mm) on two spots of a sample cloth according to AATCC-TM 118-1966.

TABLE 1

| Water-repellency No. | Conditions |
| --- | --- |
| 100 | No adhesion or wet on a surface |
| 90 | A little adhesion or wet on a surface |
| 80 | Partial adhesion or wet on a surface |

TABLE 1-continued

| Water-repellency No. | Conditions |
| --- | --- |
| 70 | Adhesion or wet on a surface |
| 50 | Adhesion or wet on a whole surface |
| 0 | Wet on a surface and a back face |

TABLE 2

| Oil-repellency No. | Sample liquid | Surface tension (dyne/cm) (at 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Hexadecane 35/ Nujol 65 mixture | 29.6 |
| 1 | Nujol | 31.2 |
| 0 | Worse than 1 | |

The soil-releasability is measured as follows:

On a horizontally placed sheet of blotting paper, a test cloth is spread. Then on the cloth, are dropped five drops of a dirty motor oil which is SAE 20W-40 oil and has been used in a motor of an automobile for 4,000 km driving. Over the dropped oil, a polyethylene sheet is covered and a 2 kg weight is placed. After 60 seconds, the weight and the polyethylene sheet are removed, excess oil is wiped off and the cloth is kept standing at room temperature for one hour. Thereafter, the test cloth and ballast cloth (1 kg in total) are washed with 25 g of a detergent (Super Zabu, a trade name) in an electric washing machine containing 35 liters of water kept at 40° C. for 10 minutes, rinsed and air dried. The condition of remaining stain is compared with standard photographs for evaluation and the soil-releasability is evaluated according to the criteria of Table 3. As the standard photographs, those of AATCC testing method 130-1970 are used.

TABLE 3

| Grade | Judging standard |
| --- | --- |
| 1.0 | Very large amount of stain remains |
| 2.0 | A large amount of stain remains |
| 3.0 | A small amount of stain remains |
| 4.0 | Stain is not remarkable |
| 5.0 | No stain |

EXAMPLE 1

$CF_3CF_2(CF_2CF_2)_nCH_2CH_2OCOC(CH_3)=CH_2$ (a mixture of the compounds in which n=3, 4 and 5 in a weight ratio of 5:3:1) (25 g), $CH_2=C(CH_3)COO(CH_2CH_2O)_9H$ (15 g), $CH_2=C(CH_3)-COOCH_2CH(OH)CH_3$ (50 g), deoxidized water (200 g), isopropanol (200 g), n-laurylmercaptan (0.1 g) and azobisisobutylamidine hydrochloride (1 g) were charged in a glass autoclave and well dispersed by stirring in a nitrogen stream. After nitrogen gas was further bubbled in the mixture for one hour to purify it, butadiene (10 g) was added to the mixture and stirred at 60° C. for 20 hours to copolymerize the monomers. Gas chromatographic analysis of the reaction mixture indicated that conversion was 99% or higher. From this conversion, the monomeric unit ratio in the produced copolymer substantially corresponded to that of the charged monomers. The dispersion contained 20% of the copolymer.

EXPERIMENT 1

The dispersion of copolymer prepared in Example 1 was diluted with water to a solid content of 0.5% by weight. In the diluted dispersion, a blended yarn cloth of 35% of cotton and 65% of polyester was dipped and squeezed with rolls to wet pickup of 80%. Then, the cloth was dried at 100° C. for 3 minutes and heated at 150° C. for 3 minutes to impart water- and oil-repellency. The treated cloth had water-repellency number of 50, oil-repellency number of 1 and soil-releasability of 4. By repeating the washing procedure for determining the soil-releasability, the durability of these properties was determined. As seen from Table 4, the water-repellency number was 50, the oil-repellency number was 0 and soil-releasability was 3 after five time washing.

EXAMPLE 2

In the same manner as in Example 1 but using $CF_3CF_2(CF_2CF_2)_nCH_2CH_2OCOCH=CH_2$ (a mixture of the compounds in which n=3, 4 and 5 in a weight ratio of 5:3:1) (25 g), $CH_2=C(CH_3)COO(CH_2CH_2O)_6H$ (50 g), $CH_2=CHCOOCH_2CH(OH)CH_2Cl$ (15 g) and 2-ethylhexyl methacrylate (10 g), a copolymer was prepared. The obtained dispersion contained 20% of the copolymer. The monomeric composition and molecular weight of the copolymer are shown in Table 4.

EXPERIMENTS 2-6

Each of the dispersion prepared in Example 2 and dispersions which were prepared in the same manner as in Example 1 and contained copolymers having the monomeric compositions and molecular weights in Table 4 was diluted with water to a solid content of 0.5%. With each diluted dispersion, the same blended yarn cloth as used in Experiment 1 was treated as in Experiment 1. The properties of the treated cloth are shown in Table 4. The molecular weight was measured by gel permeation chromatography.

COMPARATIVE EXAMPLES 1 AND 2

Copolymers having the monomeric compositions shown in Table 4 were prepared in the same manner as in Example 1. The properties of the cloth treated with the dispersion are shown in Table 4.

The abbreviations in Table 4 have following significances:

SFMA: $CF_3CF_2(CF_2CF_2)_nCH_2CH_2OCOC(CH_3)=CH_2$ (a mixture of the compounds in which n=3, 4 and 5 in a weight ratio of 5:3:1)
SFA: $CF_3CF_2(CF_2CF_2)_nCH_2CH_2OCOCH=CH_2$ (a mixture of the compounds in which n=3, 4 and 5 in a weight ratio of 5:3:1)
BrFA: $(CF_3)_2CF(CF_2CF_2)_nCH_2CH_2OCOCH=CH_2$ (a mixture of the compounds in which n=3, 4 and 5 in a weight ratio of 5:3:1)
PE-350: $CH_2=C(CH_3)COO(CH_2CH_2O)_9H$
PE-200: $CH_2=C(CH_3)COO(CH_2CH_2O)_6H$
PME-400: $CH_2=C(CH_3)COO(CH_2CH_2O)_9CH_3$
PP-500: $CH_2=C(CH_3)COO[CH_2CH(CH_3)O]_9H$
HPMA: 2-Hydroxypropyl methacrylate
HEMA: 2-Hydroxyethyl methacrylate
HEA: 2-Hydroxyethyl acrylate
GLM: Glycerol monomethacrylate

TABLE 4

| Experiment No. | Monomeric composition of copolymer (wt. ratio) | MW of copolymer | Water-repellency Initial | Water-repellency After 5 time washing | Oil-repellency Initial | Oil-repellency After 5 time washing | Soil-releasability Initial | Soil-releasability After 5 time washing |
| --- | --- | --- | --- | --- | --- | --- | --- | --- |
| 1 | SFMA/PE-350/HPMA/Butadiene (25/15/50/10) | 12,000 | 50 | 50 | 3 | 2 | 5 | 4 |
| 2 | SFA/PE-200/HEMA/Butadiene (25/50/15/10) | 15,000 | 50 | 50 | 3 | 2 | 4 | 3 |
| 3 | BrFA/PME-400/HEA/Butadiene (30/15/15/40) | 8,000 | 70 | 50 | 5 | 4 | 4 | 3 |
| 4 | SFA/PE-350/HEMA/Butadiene (40/20/20/20) | 7,000 | 70 | 50 | 5 | 4 | 5 | 4 |
| 5 | SFMA/PP-500/HPMA/Butadiene (40/20/30/10) | 9,000 | 70 | 50 | 5 | 4 | 5 | 4 |
| 6 | SFA/PME-400/GLM/Butadiene (60/15/15/10) | 6,000 | 80 | 70 | 6 | 5 | 4 | 4 |
| Comp. 1 | SFMA/PE-350/Butadiene (50/30/20) | 12,000 | 70 | 50 | 4 | 2 | 4 | 2 |
| Comp. 2 | SFA/HPMA/Butadiene (50/35/15) | 10,000 | 70 | 50 | 3 | 2 | 4 | 2 |

EXAMPLE 7

$CF_3CF_2(CF_2CF_2)_nCH_2CH_2OCOCH=CH_2$ (a mixture of the compounds in which n=3, 4 and 5 in a weight ratio of 5:3:1) (25 g), $CH_2=C(CH_3)COO(CH_2CH_2O)_6H$ (50 g), $CH_2=CHCH_2$— $CH_{20}H$ (15 g), 2-ethylhexyl methacrylate (10 g), deoxidized water (190 g), isopropanol (200 g) and n-lauroylmercaptan (0.1 g) were charged in a four-necked glass flask (one liter) equipped with a mercury thermometer and a stirrer having polytetrafluoroethylene made crescent shape blades and dispersed by stirring in a nitrogen stream. After nitrogen gas was further bubbled in the mixture for one hour to purify it, a solution of azobisisobutylamidine hydrochloride (1 g) in water (10 g) was added to the mixture and stirred at 60° C. for 10 hours in the nitrogen stream to copolymerize the monomers. Gas chromatographic analysis of the reaction mixture indicated that conversion was 99% or higher. This conversion indicated that the monomeric unit ratio in the produced copolymer substantially corresponded to that of the charged monomers. The dispersion contained 20% of the copolymer.

EXPERIMENT 7

The dispersion of copolymer prepared in Example 7 was diluted with water to a solid content of 0.5% by weight. In the diluted dispersion, a blended yarn cloth of 35% of cotton and 65% of polyester was dipped and squeezed with rolls to wet pickup of 80%. Then, the cloth was dried at 100° C. for 3 minutes and heated at 150° C. for 3 minutes to impart water- and oil-repellency. The treated cloth had water-repellency number of 50, oil-repellency number of 1 and soil-releasability of 4. By repeating the washing procedure for determining the soil-releasability, the durability of these properties was determined. As seen from Table 5, the water-repellency number was 50, the oil-repellency number was 0 and soil-releasability was 3 after five time washing.

EXAMPLE 8

In the same manner as in Example 7 but using $CF_3CF_2(CF_2CF_2)_nCH_2CH_2OCOCH=CH_2$ (a mixture of the compounds in which n=3, 4 and 5 in a weight ratio of 5:3:1) (25 g), $CH_2=C(CH_3)COO(CH_2CH_2O)_6H$ (50 g), $CH_2=CHCOOCH_2CH(OH)CH_2Cl$ (15 g) and 2-ethylhexyl methacrylate (10 g), a copolymer was prepared. The obtained dispersion contained 20% of the copolymer. The monomeric composition and molecular weight of the copolymer are shown in Table 5.

EXPERIMENTS 8-15

Each of the dispersion prepared in Example 7 and dispersions which were prepared in the same manner as in Example 7 and contained copolymers having the monomeric compositions and molecular weights in Table 5 was diluted with water to a solid content of 0.5%. With each diluted dispersion, the same blended yarn cloth as used in Experiment 1 was treated as in Experiment 7. The properties of the treated cloth are shown in Table 5.The molecular weight was measured by gel permeation chromatography.

COMPARATIVE EXAMPLES 3-7

Copolymers having the monomeric compositions shown in Table 6 were prepared in the same manner as in Example 7. The properties of the cloth treated with the dispersion are shown in Table 6.

The abbreviations which are newly used in Tables 5 and 6 have following significances:
PP-700: $CH_2=C(CH_3)COO[CH_2CH(CH_3)O]_{12}H$
M-9G: $CH_2=C(CH_3)COO(CH_2CH_2O)_9CH_3$
HCPA: 2-Hydroxy-3-chloropropyl acrylate
2-EHMA: 2-Ethylhexyl methacrylate
HMA: Hexyl methacrylate
i-PA: Isopropyl acrylate
HDA Hexadecyl acrylate

TABLE 5

| Experiment No. | Monomeric composition of copolymer (wt. ratio) | MW of copolymer | Water-repellency Initial | Water-repellency After 5 time washing | Oil-repellency Initial | Oil-repellency After 5 time washing | Soil-releasability Initial | Soil-releasability After 5 time washing |
| --- | --- | --- | --- | --- | --- | --- | --- | --- |
| 7 | SFA/PE-200/HEA/2-EHMA (25/50/15/10) | 20,000 | 50 | 50 | 1 | 0 | 4 | 3 |
| 8 | SFA/PE-200/HCPA/2-EHMA (25/50/15/10) | 15,000 | 50 | 50 | 1 | 0 | 4 | 3 |

TABLE 5-continued

| Experiment No. | Monomeric composition of copolymer (wt. ratio) | MW of copolymer | Water-repellency Initial | Water-repellency After 5 time washing | Oil-repellency Initial | Oil-repellency After 5 time washing | Soil-releasability Initial | Soil-releasability After 5 time washing |
|---|---|---|---|---|---|---|---|---|
| 9 | SFA/PE-350/HEMA/2-EHMA (25/25/25/25) | 18,000 | 50 | 50 | 1 | 1 | 5 | 4 |
| 10 | SFMA/PP-700/HPMA/HMA (25/15/50/10) | 60,000 | 50 | 50 | 1 | 0 | 5 | 3 |
| 11 | SFMA/M-9G/HEMA/i-PA (30/15/15/40) | 8,000 | 70 | 50 | 3 | 2 | 4 | 3 |
| 12 | SFA/PE-350/HEMA/2-EHMA (40/20/20/20) | 7,000 | 70 | 50 | 3 | 2 | 5 | 4 |
| 13 | BrFA/PE-200/GLM/HDA (40/25/25/10) | 10,000 | 70 | 50 | 3 | 2 | 5 | 3 |
| 14 | BrFA/M-9G/HPMA/2-EHMA (40/20/30/10) | 12,000 | 70 | 50 | 3 | 2 | 5 | 4 |
| 15 | SFMA/PE-350/HEA/i-PA (60/15/15/10) | 6,000 | 80 | 70 | 6 | 5 | 4 | 3 |

TABLE 6

| Comparative Experiment No. | Monomeric composition of copolymer (wt. ratio) | MW of copolymer | Water-repellency Initial | Water-repellency After 5 time washing | Oil-repellency Initial | Oil-repellency After 5 time washing | Soil-releasability Initial | Soil-releasability After 5 time washing |
|---|---|---|---|---|---|---|---|---|
| 3 | SFA/PE-350 (60/40) | 18,000 | 50 | 0 | 2 | 0 | 4 | 1 |
| 4 | SFA/HEMA (50/50) | 22,000 | 50 | 0 | 1 | 0 | 4 | 2 |
| 5 | SFA/PE-200/HEA (40/30/30) | 12,000 | 50 | 0 | 1 | 4 | 5 | 2 |
| 6 | SFA/PE-350/2-EHMA (40/40/20) | 8,000 | 50 | 0 | 1 | 0 | 4 | 1 |
| 7 | SFA/HEMA/2-EHMA (40/50/10) | 7,000 | 50 | 0 | 1 | 0 | 4 | 2 |

What is claimed is:

1. A copolymer comprising:
   (a) an acrylate or methacrylate ester having a fluoroalkyl group,
   (b) a polyalkylene glycol acrylate or methacrylate,
   (c) an acrylate or methacrylate ester having a hydroxyl group, and
   (d) at least one compound selected from the group consisting of an alkyl acrylate, an alkyl methacrylate and butadiene.

2. The copolymer according to claim 1, which has a number average molecular weight of 1000 to 500,000, as measured by gel permeation chromatography.

3. The copolymer according to claim 1, which has a number average molecular weight of 5000 to 200,000, as measured by gel permeation chromatography.

4. The copolymer according to claim 1, wherein the acrylate or methacrylate having the fluoroalkyl group (a) is a compound of the formula:

$$R_fROCOCR^1=CH_2$$

wherein $R_f$ is a straight or branched $C_3$-$C_{20}$ perfluoroalkyl group, $R^1$ is a hydrogen atom or a methyl group, and R is a straight or branched $C_1$-$C_{10}$ alkylene group, a $-SO_2N(R^2)R^3-$ group in which $R^2$ is a $C_1$-$C_{10}$ alkyl group and $R^3$ is a straight or branched $C_1$-$C_{10}$ alkylene group, or a $-CH_2CH-(OR^4)CH_2-$ group in which $R^4$ is a hydrogen atom or a $C_1$-$C_{10}$ acyl group.

5. The copolymer according to claim 4, wherein the acrylate or methacrylate having the fluoroalkyl group is
$CF_3(CF_2)_7(CH_2)_{10}OOCH=CH_2$,
$CF_3(CF_2)_6CH_2OCOC(CH_3)=CH_2$,
$(CF_3)_2CF(CF_2)_8(CH_2)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_8CH_2CH(OCOCH_3)CH_2OCOC(CH_3)=CH_2$, or
$(CF_3)_2CF(CF_2)_8CH_2CH(OH)CH_2OCOCH=CH_2$.

6. The copolymer according to claim 1, wherein the polyalkylene glycol acrylate or methacrylate (b) is a compound of the formula:

$$CH_2=CR^5COO-(R^6O)_n-R^7$$

wherein $R^5$ and $R^7$ are independently a hydrogen atom or a methyl group, $R^6$ is a $C_2$-$C_6$ alkylene group, and n is an integer of 3 to 50.

7. The copolymer according to claim 6, wherein the polyalkylene glycol acrylate or methacrylate (b) is polyethylene glycol acrylate or methacrylate $R^6$ is $-CH_2CH_2-$, $-CH(CH_3)CH_2-$ or $-CH(C_2H_5)CH_2-$, and n is an integer of 9 to 25.

8. The copolymer according to claim 1, wherein the polyalkylene glycol acrylate or methacrylate (b) is
$CH_2=C(CH_3)COO(CH_2CH_2O)_{3-9}H$,
$CH_2=C(CH_3)COO(CH_2CH_2O)_9H$,
$CH_2=C(CH_3)COO(CH_2CH_2O)_6H$,
$CH_2=CHCOO[CH_2CH(CH_3)O]_{11}H$,
$CH_2=CHCOO(CH_2CH_2O)_9H$,
$CH_2=C(CH_3)COO(CH_2CH_2O)_5-[CH_2CH(CH_3)O]_3H$,
$CH_2=C(CH_3)COO(CH_2CH_2O)_9CH_3$, or
$CH_2=C(CH_3)COO(CH_2CH_2O)_{23}H$.

9. The copolymer according to claim 1, wherein the alkyl acrylate or methacrylate ester having the hydroxyl group (c) is 2-hydroxybutyl (meth)acrylate, glycerol mono(meth)acrylate, 2-hydroxyethyl (meth)acrylate, 2-hydroxypropyl (meth)acrylate or 3-chloro-2-hydroxypropyl (meth)acrylate.

10. The copolymer according to claim 1, wherein the acrylate or methacrylate (d) is a compound of the formula:

$$CH_2=CR^8COOR^9$$

wherein $R^8$ is a hydrogen atom or a methyl group, and $R^9$ is a $C_1$-$C_{20}$ straight, branched or cyclic alkyl group.

11. The copolymer according to claim 10, wherein the acrylate or methacrylate is
$CH_2=C(CH_3)COOCH_2CH_2CH_3$,
$CH_2=C(CH_3)COO(CH_2)_5CH_3$,
$CH_2=CHCOOCH_2CH(C_2H_5)CH_2CH_2CH_2CH_3$,
$CH_2=CHCOO(CH_2)_{15}CH_3$,
$CH_2=CHCOOCH_2CH_2CH(CH_3)_2$,
$CH_2=CHCOOCH(CH_3)_2$,
$CH_2=CHCOOCH_2C(CH_3)_2CH_2CH(CH_3)_2$,
$CH_2=C(CH_3)COOCH_2(CH_2)_7C(CH_3)_3$,
cyclohexyl (meth)acrylate, or
$CH_2=C(CH_3)COO(CH_2)_2CH(CH_3)CH_2CH(CH_3)_2$.

12. The copolymer according to claim 1, wherein the ratio of (a) is at least 20% by weight, (b) is at least 10% by weight, (c) is at least 10% by weight and (d) is at least 5% by weight, based on the weight of the copolymer.

13. The copolymer according to claim 1, wherein the ratio of (a) is at least 20% by weight, (b) is at least 10% by weight, (c) is at least 10% by weight and (d) is at least 5% by weight, based on the weight of the copolymer.

14. The copolymer according to claim 1, wherein the ratio of (a) is at least 30 to 60% by eight, (b) is 15 to 50% by weight, (c) is 15 to 50% by weight and (d) is 10 to 40% by weight, based on the weight of the copolymer.

15. The copolymer according to claim 1, which further comprises at least one other comonomer having no fluoroalkyl group selected from ethylene, vinyl chloride, a vinylidene halogenide, styrene, acrylic acid, methacrylic acid, benzyl methacrylate, a vinyl alkyl ketone, a vinyl alkyl ether, isoprene, chloroprene or maleic anhydride.

* * * * *